(12) United States Patent
Liepert (10) Patent No.: US 11,847,203 B2
(45) Date of Patent: Dec. 19, 2023

(54) METHOD, SYSTEM AND DEVICE FOR MANAGING AN EXECUTION OF A PROGRAM RELATING TO PART OR ALL OF A FIRST APPLICATION

(71) Applicant: THALES DIS CPL USA, Inc., Belcamp, MD (US)

(72) Inventor: Martin Liepert, Gemenos (FR)

(73) Assignee: THALES DIS CPL USA, INC., Austin, TX (US)

( * ) Notice: Subject to any disclaimer, the term of this patent is extended or adjusted under 35 U.S.C. 154(b) by 163 days.

(21) Appl. No.: 17/419,405

(22) PCT Filed: Dec. 31, 2019

(86) PCT No.: PCT/EP2019/087200
§ 371 (c)(1),
(2) Date: Jun. 29, 2021

(87) PCT Pub. No.: WO2020/141182
PCT Pub. Date: Jul. 9, 2020

(65) Prior Publication Data
US 2022/0067144 A1 Mar. 3, 2022

(30) Foreign Application Priority Data
Dec. 31, 2018 (EP) ..................... 18216003

(51) Int. Cl.
*G06F 21/00* (2013.01)
*G06F 21/52* (2013.01)
(52) U.S. Cl.
CPC ........ *G06F 21/52* (2013.01); *G06F 2221/033* (2013.01); *G06F 2221/2153* (2013.01)

(58) Field of Classification Search
CPC .............. G06F 21/52; G06F 2221/033; G06F 2221/2153
See application file for complete search history.

(56) References Cited

U.S. PATENT DOCUMENTS

| | | |
|---|---|---|
| 7,458,100 B2 | 11/2008 | Jascau et al. |
| 9,317,689 B2 | 4/2016 | Aissi |
| 9,953,158 B1 | 4/2018 | Benameur et al. |

(Continued)

OTHER PUBLICATIONS

International Search Report (PCT/ISA/210) and Written Opinion (PCT/ISA/237) dated Mar. 19, 2020, by the European Patent Office as the International Searching Authority for International Application No. PCT/EP2019/087200.

*Primary Examiner* — Ghazal B Shehni (57) ABSTRACT

A method for managing a first application program comprises: executing, by a first processor, a first control flow; executing, by a second processor, in synchronization with the first control flow execution, a second application, comprising a variable and an expected value that the variable has to have or a condition that the variable has to satisfy to authorize an execution of the correct first control flow; verifying, by the second processor, by executing each of the at least one second application, whether the variable has the expected value or the variable satisfies the condition; and inferring, by the second processor, if, for the second application, the variable has (not) the expected value or does (not) satisfy the condition, that the first processor is (not) executing the correct first control flow.

10 Claims, 2 Drawing Sheets

(56) References Cited

U.S. PATENT DOCUMENTS

| | | | |
|---|---|---|---|
| 10,025,930 B2* | 7/2018 | Li | G06F 9/30061 |
| 10,061,915 B1 | 8/2018 | Roth et al. | |
| 2005/0198626 A1* | 9/2005 | Kielstra | G06F 9/52 |
| | | | 717/156 |
| 2016/0266900 A1* | 9/2016 | Anzai | G06F 9/3005 |
| 2016/0283245 A1* | 9/2016 | Ben-Kiki | G06F 12/0895 |
| 2018/0089422 A1 | 3/2018 | Kounavis et al. | |

\* cited by examiner

METHOD, SYSTEM AND DEVICE FOR MANAGING AN EXECUTION OF A PROGRAM RELATING TO PART OR ALL OF A FIRST APPLICATION

FIELD OF THE INVENTION

The invention relates generally to a method, a system and a device for managing an execution of a program relating to at least a part of a first (SoftWare (or SW)) application.

The present invention is notably applicable to a first processor that may be included in a first device, like e.g., a Personal Computer (or PC), and a second processor that may be included in a second device, like e.g., a server or a HardWare (or HW) token.

The chip, such as a chip included within a Smart Card (or SC), a Universal Serial Bus (or USB) dongle or a HW token, may be embedded in or removable from the first device.

The chip may be included within a Secure Element (or SE).

Within the present description, an SE is a smart object including a chip(s) that protect(s), as a tamper resistant HW component(s), access to stored and processed data and is intended to communicate data with one or several devices, such as a PC, a Machine to Machine (or M2M), an Internet of Things (or IoT) device, a server and/or the like.

The present invention is applicable to a first processor and a second processor that are both included in one and the same device, like e.g., a PC, a tablet or a mobile (tele)phone, or any computing device.

STATE OF THE ART

U.S. Pat. No. 7,458,100 B2 describes a solution in which a portion of a SW application code is converted into a code and the converted code is sent to a HW token and executed exclusively by the HW token. Such a solution allows protecting a corresponding function of the SW application that is supported by a PC from being reverse-engineered.

There is a need to provide an alternative solution that allows protecting a SW application during its execution.

SUMMARY OF THE INVENTION

The invention proposes a solution for satisfying the just herein above specified need by supplying a method for managing an execution of a program relating to at least a part of a first application, as a first application program.

According to the invention, the method comprises:
a) executing, by a first processor, a first control flow;
b) executing, by a second processor, in synchronization with the first control flow execution, at least one second application, the at least one second application comprising, each, when executed by the second processor in synchronization with the first control flow execution, at least one predetermined variable and at least one expected value that the at least one predetermined variable has to have or at least one predetermined condition that the at least one predetermined variable has to satisfy to authorize an execution of the right first control flow by the first processor;
c) verifying, by the second processor, by executing each of the at least one second application, whether the at least one predetermined variable has or has not the at least one expected value or whether the at least one predetermined variable does or does not satisfy the at least one predetermined condition; and
d) inferring, by the second processor, if, for each of all of the at least one second application executed by the second processor, the at least one predetermined variable has the at least one expected value or the at least one predetermined variable satisfies the at least one predetermined condition, that the first processor is executing the right first control flow; or
e) inferring, by the second processor, if, for at least one of the at least one second application executed by the second processor, the at least one predetermined variable has not the at least one expected value or the at least one predetermined variable does not satisfy the at least one predetermined condition, that the first processor is not executing the right first control flow.

The principle of the invention consists in that a first processor is running a first control flow and, in parallel to the first control flow running, a second processor is running a second application(s) that include(s), each, one or several predefined variables. The second processor checks whether the predefined variable(s) has(have) (or not) each an expected value or whether the predefined variable(s) do(es) satisfy (or not) each a predetermined condition(s), for each of all of the second application(s). In the affirmative case, the second processor concludes that the first processor is running the right first control flow. In the negative case, the second processor concludes that the first processor is not running the right first control flow.

The first processor and the second processor may be separated from each other.

It is noteworthy that the invention method may be implemented by a single processor that is able to carry out several threads, as a multi-thread processor that is able to execute multiple processes (or threads) concurrently, namely the process relating to the first control flow and the other process relating to the second application(s).

The second processor plays, when executing the second application(s), a role of a checker of a normal or right flow of an execution, by a first processor, of a program relating to a part or a whole first application, as a first application program.

The second processor uses, on its own, when executing the second application(s), the predefined variable(s) during the running of the first application flow. In other words, the first processor does not know what and how the second processor processes in parallel during the running of the first application program.

The control of the predefined variable(s) only by the second processor allows determining, when executing by the second processor the concerned second application, whether the first processor is or is not executing the right first control flow.

The invention solution allows, based on a use, by the second processor, of a predefined variable(s), detecting, dynamically, i.e. during an execution of a first application program, by executing all of the second application(s), a normal or an abnormal behaviour of the first processor that is executing the first application program.

The invention solution allows, based on a tracking by the second processor, controlling a flow of an execution of at least a part of the first application.

The invention solution allows improving notably the protection of an execution of the first application program.

According to a further aspect, the invention is a system for managing an execution of a program relating to at least a part of a first application, as a first application program.

According to the invention, the system comprises a first device and a second device. The first device comprises a first processor. The second device comprises a second processor. The first processor is configured to execute a first control flow. The second processor is configured to execute, in synchronization with the first control flow execution, at least one second application, the at least one second application comprising, each, when executed in synchronization with the first control flow execution, at least one predetermined variable and at least one expected value that the at least one predetermined variable has to have or at least one predetermined condition that the at least one predetermined variable has to satisfy to authorize an execution of the right first control flow by the first processor. The second processor is configured to verify, by executing each of the at least one second application, whether the at least one predetermined variable has or has not the at least one expected value or whether the at least one predetermined variable does or does not satisfy the at least one predetermined condition. And the second processor is configured to infer, if, for all of the at least one second application executed by the second processor, the at least one predetermined variable has the at least one expected value or the at least one predetermined variable satisfies the at least one predetermined condition, that the first processor is executing the right first control flow. Or the second processor is configured to infer, if, for at least one of the at least one second application executed by the second processor, the at least one predetermined variable has not the at least one expected value or the at least one predetermined variable does not satisfy the at least one predetermined condition, that the first processor is not executing the right first control flow.

As to the first processor, it may be included in a mobile phone, a laptop, a tablet, a netbook, a vehicle (like e.g., a car, a van or a truck), a Personal Digital Assistant (or PDA), a server or any computing device, as a first device.

As to the second processor, it may be included in a mobile phone, a laptop, a tablet, a netbook, a vehicle, a PDA, a HW token, a server or any computing device, as a second device that is distinct from the first device.

According to a further aspect, the invention is a device for managing an execution of a program relating to at least a part of a first application, as a first application program.

According to the invention, the device comprises a first processor and a second processor. The first processor is configured to execute a first control flow. The second processor is configured to execute, in synchronization with the first control flow execution, at least one second application, the at least one second application comprising, each, when executed in synchronization with the first control flow execution, at least one predetermined variable and at least one expected value that the at least one predetermined variable has to have or at least one predetermined condition that the at least one predetermined variable has to satisfy to authorize an execution of the right first control flow by the first processor. The second processor is configured to verify, by executing each of the at least one second application, whether the at least one predetermined variable has or has not the at least one expected value or whether the at least one predetermined variable does or does not satisfy the at least one predetermined condition. And the second processor is configured to:

infer, if, for all of the at least one second application executed by the second processor, the at least one predetermined variable has the at least one expected value or the at least one predetermined variable satisfies the at least one predetermined condition, that the first processor is executing the right first control flow; or infer, if, for at least one of the at least one second application executed by the second processor, the at least one predetermined variable has not the at least one expected value or the at least one predetermined variable does not satisfy the at least one predetermined condition, that the first processor is not executing the right first control flow.

The device may include e.g., a mobile phone, a laptop, a tablet, a netbook, a vehicle, a PDA, a server or any computing device.

BRIEF DESCRIPTION OF THE DRAWINGS

Additional features and advantages of the invention will be more clearly understandable after reading a detailed description of two preferred embodiments of the invention, given as indicative and non-limitative examples, in conjunction with the following drawings.

DETAILED DESCRIPTION

Herein under is considered a particular embodiment in which the invention method for managing an execution of a program relating to at least a part of a first application, as a first application program, is implemented by using a PC, as a first device, that includes a first processor and a HW token, as a second device, that includes a second processor.

The HW token includes a chip(s).

Alternately, instead of a chip included in a separated device, the chip is a Trusted Execution Environment (or TEE), as a secure area of the second processor and a secured runtime environment in the first device. According to such an embodiment (not represented), instead of using two different devices, only one device is used to include both the first processor and the second processor.

The chip(s) is(are) preferably included within an SE.

The HW token may have different form factors.

The chip may be incorporated, possibly in a removable manner, in a Printed Circuit Board (or PCB) of the chip host device.

As a removable token, it may include a smart dongle of the USB type, a (micro) Secure Digital (or SD) type card, a Multi-Media type Card (or MMC), a Subscriber Identity Module (or SIM) type card or any format medium able to include the chip.

According to another embodiment (not represented), instead of being carried by another medium, as an external HW token, the chip is embedded in the first device itself, as a chip host device and one and the same computing device.

Naturally, the described embodiment is only for exemplifying purposes and is not considered to reduce the scope of the invention.

Figure 1:
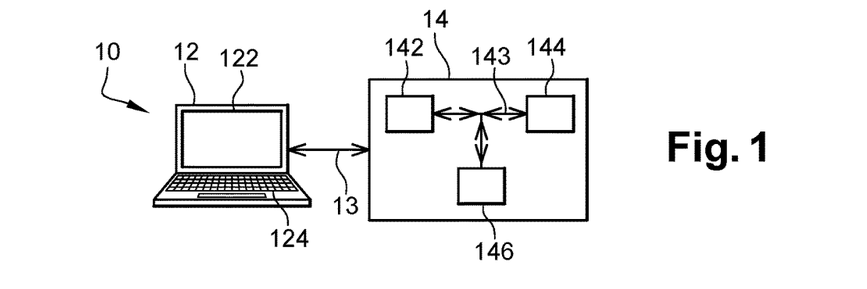
FIG. 1 illustrates a simplified diagram of one embodiment of a system that includes a PC, as a first device, with a first processor that is executing a first application program, and a HW token, as a second device, with a second processor that is executing, in synchronization with the first application program execution, a second application(s), to verify, by using a predefined variable(s), that a right first application program is (or not) being executed, according to the invention.

FIG. 1 shows schematically a system 10 for managing an execution of a program relating to at least a part of a first application, as a first application program. The system 10 comprises a PC 12, as a first computing device, and a chip 14, as a second computing device.

The PC 12 comprises a Central Processing Unit(s) (or CPU), a (micro)processor(s) and/or a (micro)controller(s), as first data processing means (not represented), a memory(ies), as data storing means (not represented), and one or several Input/Output (or I/O) interfaces that are internally connected to each other.

The first data processing means includes a first processor.

The PC 12 may include (or be connected to) a display screen 122 used for displaying information and a keyboard 164 used for selecting or entering information, as a Man Machine Interface (or MMI). The MMI allows a user (not represented) to interact with the PC 12.

The PC 12 supports (or includes) notably at least one Operating System (or OS).

The PC 12 also supports (or includes) one or several (SW) applications that include a first application to be at least partly protected during its execution.

The first processor is used for executing the first application.

The PC 12 is connected or coupled, over a first ContacT (or CT) or ContacT-Less (or CTL) link(s) 13, to (or incorporates) the chip 14.

The CTL communication protocol(s) include(s) e.g., a BluetooTH (or BTH) type protocol, a Bluetooth Low Energy (or BLE) type protocol, a Near Field Communication (or NFC) type protocol, a Zigbee type protocol and/or a Wi-Fi type protocol. The CTL communication protocol(s) may include any other wireless communication protocol that is supported by the PC 12 and the chip 14 and that allows communicating data between the PC 12 and the chip 14.

The chip 14 comprises a (micro)processor(s) and/or a (micro)controller(s), as second data processing means 142, a memory(ies), as data storing means 144, and one or several I/O interfaces 146 that are internally connected, through a control and data bus 143, to each other.

The second data processing means includes a second processor.

The chip 14 supports (or includes) notably at least one OS and one or several (SW) applications that include one or several second applications.

The second processor is preferably arranged to verify the presence of an authorization of an execution, by the first processor, of the first application to be protected, prior to its execution (or running) by the first processor. Such an authorization presence verification allows preventing any unauthorized use of the first application. Such an authorization presence verification allows binding the first application with a presence of the second processor.

At least some of the second application(s) may be written, as an applet(s), in a Java programming language, and may be executed by a Virtual Machine (or VM) embedded in the chip 14.

At least some of the second application(s) is loaded (or downloaded), individually or collectively, dynamically and prior to be executed by the second processor, and preferably in an encrypted and signed manner, in the chip 14. The chip 14 verifies, based on received signed data relating to each concerned second application and a sender public key, that the sender of the concerned second application is the alleged and authorized sender and, only when the sender is successfully authenticated, decrypts the encrypted second application on-the-fly.

Then, the chip 14 memory(ies) store(s) the second application(s).

Each of the second application(s) is to be executed by the second processor to protect an execution, by the first processor, of at least a part of the first application.

Each of the second application(s) is executed by the second processor to conclude or infer that the first control flow is or is not the right first control flow that is being executed synchronously by the first processor.

The second processor is arranged to execute, in synchronization with the first control flow execution by the first processor, the second application(s).

The second application(s) comprises, each, when executed by the second processor in synchronization with the first control flow execution, one or several predefined variables and one or several associated expected values which the predefined variable(s) has(have) to have and/or one or several predetermined conditions which the predefined variable(s) has(have) to satisfy to authorize an execution of the right first control flow by the first processor.

The second processor is adapted to verify, while executing the (or each of the) second application(s) in synchronization with the first control flow that is being executed, by the first processor, whether one or several predefined variables have or have not, each, the associated expected value and/or whether one or several predefined variables do or do not satisfy the predetermined condition(s).

The second processor is configured to infer, if, for each of all of the second application(s) executed by the second processor, the predefined variable(s) has(have) the expected value(s) and/or the predefined variable(s) satisfies (y) the predetermined condition(s), that the first processor is executing the right first control flow.

When detecting such a normal behavior for the whole of the first control flow (i.e. all of the node(s) comprised in the first control flow) execution, the second processor is adapted to authorize the first processor to execute the right first control flow.

The second processor is configured to infer, if, for one or several of the second applications executed by the second processor, one or several predefined variables do not have the expected value(s) and/or the predefined variable(s) do(es) not satisfy the predetermined condition(s), that the first processor is not executing the right first control flow.

When detecting such an abnormal behavior (or an anomaly(ies) or a misbehavior) of the first control flow execution, the second processor is preferably adapted to forbid the first processor to execute the right first control flow, i.e. at least a current node and/or a next node(s) included in the right first control flow. Instead of executing, by the first processor, the right first control flow, the second processor is preferably adapted to re-direct to one or several predetermined instructions to be executed by the first or second processor. Such predetermined instruction(s) allow(s), when executed by the first or second processor, to issue no result or a result value that is distinct from a right result value that is issued only when the right first control flow is effectively executed by the first processor. While issuing no result or a result value that is distinct from a right result value, the first or second processor has a wrong or incorrect behavior that is distinct from the right or correct behavior by which the first processor executes the right first control flow.

Such a managing, by the second processor that executes the second application(s), of execution of a first application program allows detecting that an execution, by the first processor, of the first control flow has or has not been modified with respect to the right first control flow, as a normal or an abnormal behavior of the first control flow respectively.

The synchronization of the second application execution by the second processor with the first control flow execution by the first processor allows obfuscating the first control flow execution, in order to prevent the first application from being reverse-engineered.

The first control flow execution obfuscation contributes to disguise the first application program flow execution.

Figure 2:
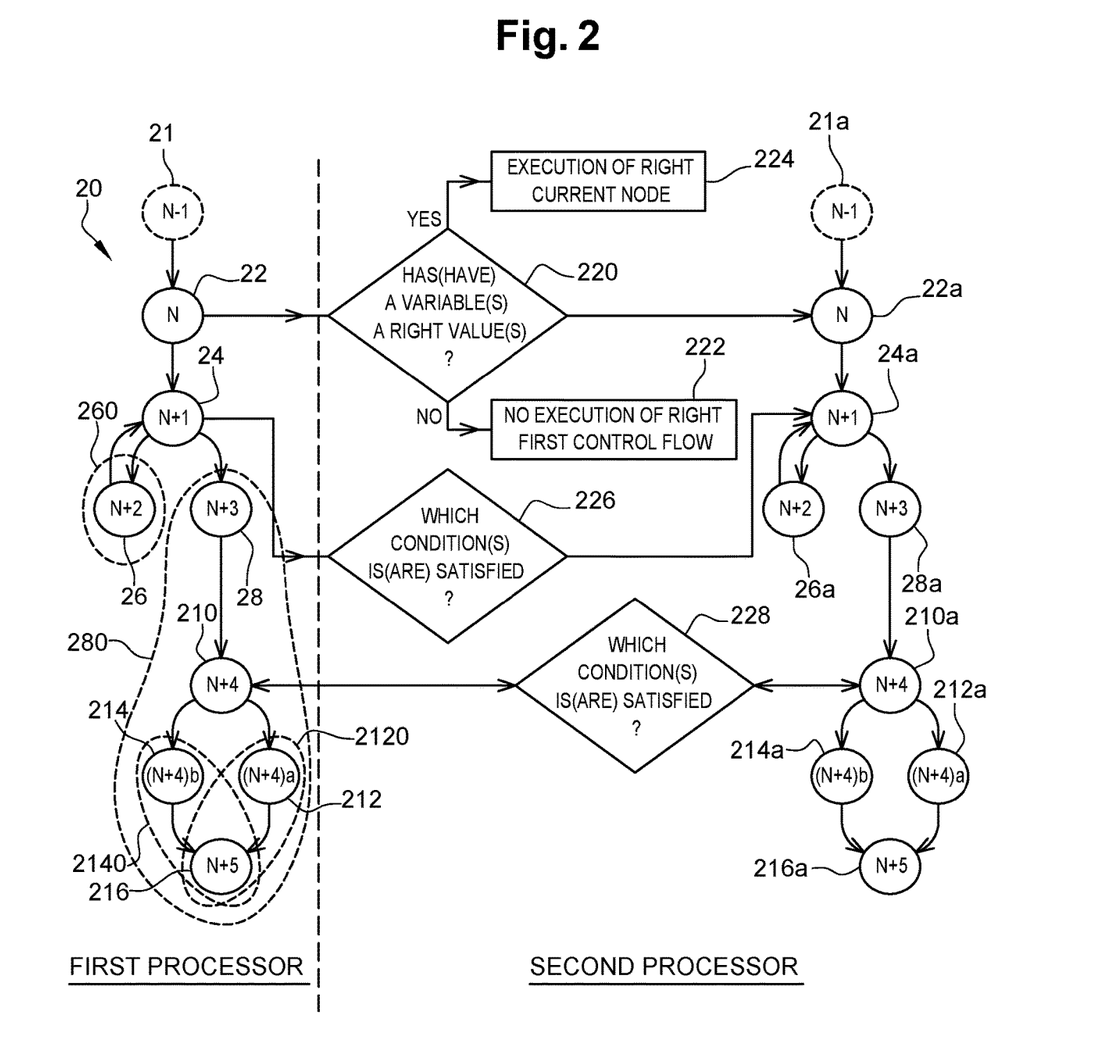
FIG. 2 is a first example of first control flow graph in association with a first embodiment of a second application for each of several nodes of the first example of the first control flow graph, according to the invention.

FIG. 2 depicts a first example of a first control flow graph 20 and a second application(s) that is(are) being executed, by the second processor, synchronously with the first control flow execution.

The first processor is executing the first control flow.

The first control flow includes one or several nodes.

Each node of the first control flow includes a set of one or several instructions, as a basis block.

Each node to be executed and each transition from one node to the following or next node of the first control flow graph may be associated with a second application(s) executed by the second processor in synchronization with the first control flow.

The second processor manages, when executing the second application, a predefined variable(s) to be compared to an associated expected (or reference) value(s) or a predetermined condition(s) to be satisfied by a predefined variable(s), when executing, by the first processor, concurrently the first control flow.

The second processor generates preferably, by executing the concerned second application, the expected value(s) associated with the predefined variable(s) in an autonomous manner, by using like e.g., a predefined input parameter "x" that either is assigned a specific expected value or has a value that is a result of a predefined function of either the predefined input parameter f(x), like e.g., the function "x+2" (or "x++" in C language) and/or a predefined internal state variable(s), like e.g., a function g that uses the expected identifier of the current node of the right first control flow, such as "x=x+current node" in C language.

Each of the second application(s) comprises one or several predefined variables, one or several expected (or reference) values associated with the predefined variables and/or one or several predetermined conditions that one or several predefined variables have to satisfy, so as to authorize an execution of the right first control flow.

Advantageously, each of the predefined variable(s) is internally used by the second processor, when executing the concerned second application.

Each of the predefined variable(s) may include one or several predetermined input parameters and/or one or several predetermined internal state variables.

The predetermined internal state variable(s) may include one or several predefined identifiers relating to one or several corresponding nodes to be executed in the first control flow by the first processor.

The predefined internal state variable(s) may include:

a predetermined identifier, as an expected or reference identifier, relating to the current node that is to be executed, by the first processor, in a synchronous manner;

a predetermined identifier, as an expected or reference identifier, relating to a node, as the previous node, that precedes the current node that is to be executed, by the first processor, in a synchronous manner; and/or a predetermined identifier, as an expected or reference identifier, relating to a node, as the next node, that follows the current node that is to be executed, by the first processor, in a synchronous manner.

It is assumed that the first example of the first control flow graph includes:

a first node 22 (of the first control flow) that has been assigned the unique number e.g., "N", as an identifier relating to the current node, that is followed by, i.e. through a jump to, namely without having any condition to be satisfied (or unconditional), a second node 24 (of the first control flow) that has been assigned the unique number e.g., "N+1", as an identifier relating to the second node, that may be followed by:

either a third node 26 (of the first control flow) that has been assigned the unique number e.g., "N+2", as an identifier relating to the third node, that is followed by, i.e. through a jump to, the second node 24, or a fourth node 28 (of the first control flow) that has been assigned the unique number e.g., "N+3", as an identifier relating to the fourth node that is followed by, i.e. through a jump to, a fifth node 210 (of the first control flow) that has been assigned the unique number e.g., "N+4", as an identifier relating to the fifth node that may be followed by:

either a sixth node 212 (of the second control flow) that has been assigned the unique number e.g., "(N+4)a", as an identifier relating to the sixth node;

or a seventh node 214 (of the first control flow) that has been assigned the unique number e.g., "(N+4)b", as an identifier relating to the seventh node;

the seventh node 214 and possibly the sixth node 212 are followed by:

an eighth node 216 (of the first control flow) that has been assigned the unique number e.g., "N+5", as an identifier relating to the eighth node.

Prior to executing the first node 22, the first processor may have executed a previous node 21 (of the first control flow) that has been assigned the unique number e.g., "N−1", as an identifier relating to the previous node. While executing, by the first processor, the first node 22 in the first control flow, the second processor knows that the right first control flow includes a corresponding previous node 21a.

The first processor is executing the first node 22, as the current node to be executed in the first control flow.

The second processor is executing, in synchronization with the first control flow execution, a second application associated with the first node 22.

The second processor knows that the right first control flow includes a corresponding first node 22a.

The second application comprises one or several predefined variables that have to have expected (or reference) values and/or that have to satisfy one or several predetermined conditions, so as to authorize, when the second processor is executing the second application, a parallel execution of the first node 22 of the first control flow.

The second processor verifies 220, when executing the second application, whether the predefined variable(s) do(es) or do(es) not have the expected value(s), like e.g., whether the previous node has or has not the expected identifier "N−1" relating to the previous node 21a of the right first control flow and/or whether the next node has or has not the expected identifier "N+1" relating to a next node 24a of the right first control flow and/or whether the current node has or has not the expected identifier "N" relating to the current node 22a of the right first control flow.

The second processor infers 222, when executing the second application, that, if the predefined variable(s) do(es) not have the expected value(s), like e.g., the previous node has not the expected identifier "N−1" relating to the previous node 21a of the right first control flow and/or the next node has not the expected identifier "N+1" relating to a next node 24a of the right first control flow and/or the current node has not the expected identifier "N" relating to the current node 22a of the right first control flow, that the first processor is not executing the right current node 22a included in the right first control flow.

In such a misbehavior (or wrong behavior) detection case, i.e. the predefined variable(s) do(es) not have the expected value(s), for the second application executed by the second processor, the second processor executes preferably a predetermined instruction(s). The predetermined instruction(s) allow(s), when executed, to issue either no result or a result value that is distinct from a right result value that is issued only when the right first control flow is effectively executed by the first processor.

Otherwise, the second processor infers 224, when executing the second application, that, if the predefined variable(s) has(have) the expected value(s), like e.g., the previous node has the expected identifier "N−1" relating to the previous node 21a of the right first control flow and/or the next node has the expected identifier "N+1" relating to a next node 24a of the right first control flow and/or the current node has the expected identifier "N" relating to the current node 22a of the right first control flow, that the first processor is executing the right current node 22a included in the right first control flow.

In such a right behavior detection case, i.e. the predefined variable(s) has(have) the expected value(s), the second processor authorizes, when executing the second application, to continue the right first control flow execution by the first processor.

Then, the first processor is executing the second node 24, as the current node to be executed in the first control flow.

The second application comprises one or several predefined variables that have to have expected (or reference) values and/or that have to satisfy one or several predetermined conditions, so as to authorize, when the second processor is executing the second application, a parallel execution of the second node 24 of the first control flow.

The second processor knows that the right first control flow includes a corresponding second node 24a.

The first control flow graph then includes two (or more) separated branches 260 and 280. A first branch 260 includes the third node 26, as the first node of the first branch 260, while a second branch 280 includes the fourth node 28, as the first node of the second branch 280, the fifth node 210, the fifth node 212 (or the seventh node 214) and the eight node 216. The second processor determines, when executing the (or another) second application, one transition decision between two first nodes of the two separated branches 260 and 280.

The transition decision is conditional to continue from an execution of the current node to an execution of a first node of one branch of the two separated branches 260 and 280 or a first node of another branch of the at least two separated branches 260 and 280.

To determine the transition decision between two first nodes of the two separated branches 260 and 280, the second processor verifies 226, when executing the second application, which predetermined condition(s) is(are) satisfied, like e.g., "if (x<7) Next Node=N+2; else Next Node=N+3" or "if (x<((2*Current Node)+1)) Next Node=N+2; else Next Node=N+3", so as to determine which branch is to be executed. The transition decision depends preferably on one or several predefined variables. The predefined variable(s) include(s) a predetermined input parameter(s), such as "x", and/or a predetermined internal state variable(s), such as "Current Node".

The predefined variables are used only by the second processor, when executing the second application, i.e. inside the HW token, and are not visible from the outside.

For example, based on the value(s) of the used predefined variable(s), if a condition(s) is satisfied, like e.g., "x<7; Next Node=N+2" or "x<((2*Current Node)+1; Next Node=N+2", then the first or the second processor is executing, under control of the second processor that is executing the second application, the third node 26, as the first node of the first branch 260, in the right first control flow. The second processor knows that the right first control flow includes a corresponding third node 26a.

Once the third node 26 is executed by the first or second processor, the first processor is executing the second node 24, as the next node to be executed in the right first control flow.

If an(other) condition(s) is satisfied, like e.g., "x>=7; Next Node=N+3" or "x>=((2*Current Node)+1; Next Node=N+3", then the first or the second processor is executing, under control of the second processor that is executing the second application, the fourth node 28, as the first node of the second branch 280, in the right first control flow. The second processor knows that the right first control flow includes a corresponding fourth node 28a.

Then, the first processor is executing the fifth node 210, as the current node to be executed in the first control flow.

The second application comprises one or several predefined variables that have to satisfy one or several predetermined conditions, so as to authorize, when the second processor is executing the second application, a parallel execution of the fifth node 210 of the first control flow.

The second processor knows that the right first control flow includes a corresponding fifth node 210a.

The first control flow graph then includes two (or more) separated branches 2120 and 2140 in a context of an opaque predicate. A first branch 2120 includes the seventh node 212, as the first node of the first branch 2120, and the eight node 216, while a second branch 2140 includes the eighth node 214, as the first node of the second branch 2140, and the eight node 216. The second processor determines, when executing the (or another) second application, one transition decision between two first nodes of the two separated branches 2120 and 2140.

To determine the transition decision between two first nodes of the two separated branches 2120 and 2140, the second processor verifies 228, when executing the second application, which predetermined condition(s) is(are) satisfied, like e.g., "if ((Current Node==7) && (x==7)) Next Node=(N+4)b; return (TRUE); else Next Node=(N+4)a, return (FALSE)", so as to determine which branch is to be executed. The transition decision depends preferably on one or several predefined variables. The predefined variable(s) include(s) a predetermined input parameter(s), such as "x", and/or a predetermined internal state variable(s), such as "Current Node".

The predefined variables are used exclusively by the second processor, when executing the second application, i.e. inside the HW token, and are not visible from the outside.

For example, based on the value(s) of the used predefined variable(s), if a condition(s) is satisfied, like e.g., "((Current Node==7) && (x==7))", then the first or the second processor is executing, under control of the second processor that is executing the second application, the seventh node 214, as the first node of the first branch 2140, in the right first control flow.

The second processor knows that the right first control flow includes a corresponding seventh node 214a.

Once the seventh node 214 is executed by the first or second processor, the first processor is executing the eight node 216, as the next node to be executed in the right first control flow. The second processor knows that the right first control flow includes a corresponding seventh node 216a.

If at least an(other) condition(s) is satisfied, like e.g., Current Node is different from the value "7" and/or x is different from the value "7", then the second processor is executing the sixth node 212, as the first node of the second branch 2120, which is not included in the right first control flow. In such a case, for the second application executed by the second processor, the predetermined variable(s) do(es) not satisfy the predetermined condition(s), the second processor executes one or several predetermined instructions that belong to the sixth node 212. When the second processor has executed the sixth node 212, the second processor issues either no result or a result value that is distinct from a right result value that is issued only when the right first control flow is effectively executed by the first processor.

A possible attacker needs to reverse engineer the two branches which represents an additional effort for the attacker.

Figure 3:
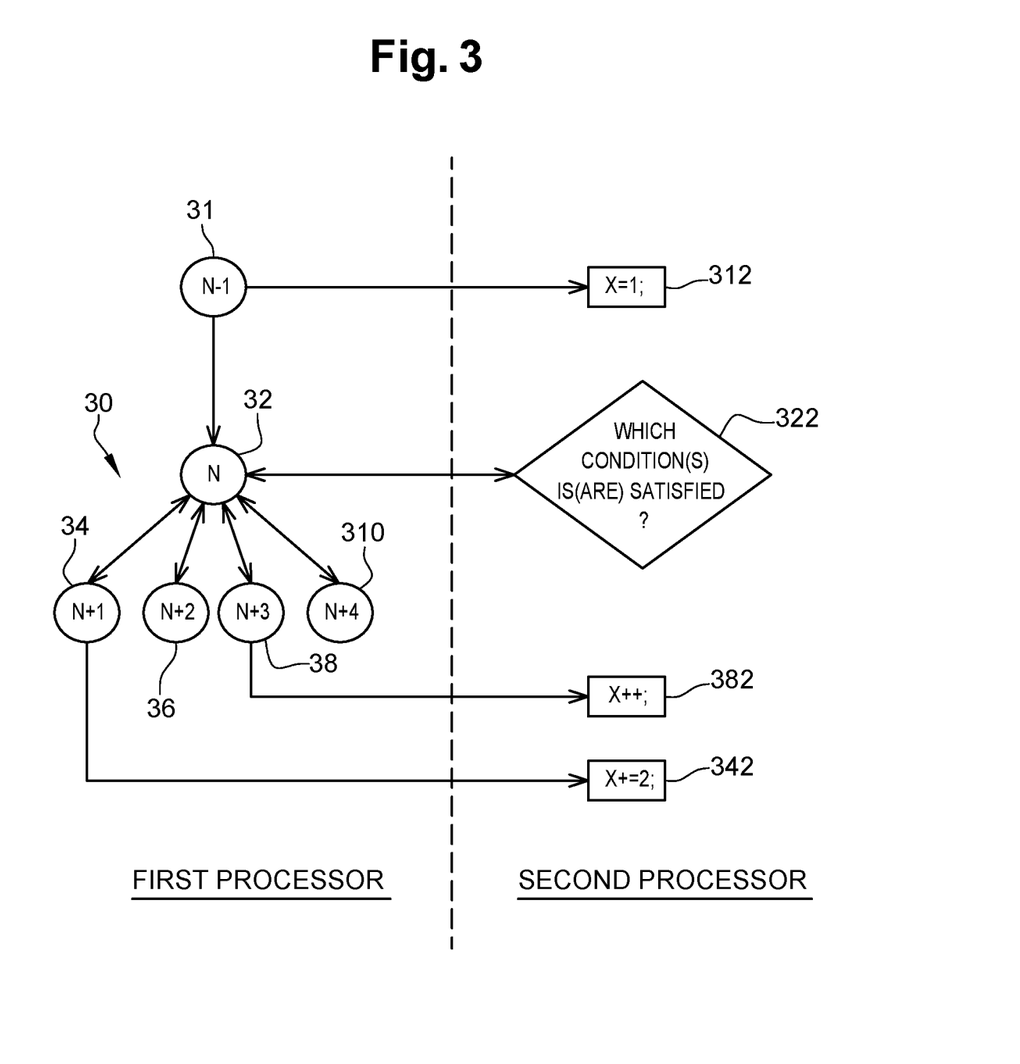
FIG. 3 represents a second example of the first control flow graph in association with a second embodiment of a second application for one node of the second example of the first control flow graph, according to the invention.

FIG. 3 depicts a second example of a first control flow graph 30 and a second application(s) that is(are) being executed, by the second processor, synchronously with the first control flow execution, when applicable.

It is assumed that the second example of the first control flow graph includes:
- a first node 31 (of the first control flow) that has been assigned the unique number e.g., "N−1", as an identifier relating to the current node, that is followed by, i.e. through a jump to, namely without having any condition to be satisfied (or unconditional),
- a second node 32 (of the first control flow) that has been assigned the unique number e.g., "N", as an identifier relating to the second node, that may be followed by:
- either a third node 34 (of the first control flow) that has been assigned the unique number e.g., "N+1", as an identifier relating to the third node, that is followed by, i.e. through a jump to, the second node 32,
- either a fourth node 36 (of the first control flow) that has been assigned the unique number e.g., "N+2", as an identifier relating to the fourth node, that is followed by, i.e. through a jump to, the second node 32,
- either a fifth node 38 (of the first control flow) that has been assigned the unique number e.g., "N+3", as an identifier relating to the fifth node, that is followed by, i.e. through a jump to, the second node 32,
- or a sixth node 310 (of the first control flow) that has been assigned the unique number e.g., "N+4", as an identifier relating to the sixth node, that is followed by, i.e. through a jump to, the second node 32.

The first processor is executing the first node 31, as the current node to be executed in the first control flow.

The second processor is executing, in synchronization with the first control flow execution, a second application associated with the first node 31.

The second processor knows that the right first control flow includes a corresponding first node (not represented).

The second application comprises one or several predefined variables, such as a predetermined input parameter, like e.g., "x", that are set 312 to predefined values, like e.g., "x=1", so as to authorize, when the second processor is executing the second application, a parallel execution of the first node 31 of the first control flow by the first processor.

The first processor is executing the second node 32, as the current node to be executed in the first control flow.

The first control flow includes e.g. the second node 32, as a dispatching node.

According to another embodiment, instead of only one dispatching node, the first control flow has several dispatching nodes.

Each dispatching node is used for obfuscating the first control flow and contributes to disguise the first control flow.

The dispatching node 32 is associated with a second application.

The second processor knows that the right first control flow includes a corresponding second node (not represented).

The second application comprises one or several predetermined variables, such as a predetermined next node to be executed after the dispatching node, as a predetermined internal state variable, in association with an expected value(s) to be assigned to the predetermined variable and in association possibly with one or several predetermined conditions to be satisfied to switch to (or continue with) an execution a next predetermined node, so as to authorize, when the second processor is executing the second application, a parallel execution of the second node 32 of the first control flow by the first processor.

The second application comprises e.g., what follows in C language:

```
Switch (node)
{
case 1:
   Node=2; break;
case 2:
   Node=3; break;
case 3:
   if (x<7)
      Node=4;
   else
      Node=5;
   break;
case 4:
   Node=3; break;
}
```

Since the predetermined internal state variable is exclusively used by the second processor, the concerned predetermined internal state variable is not visible from outside the second processor and makes it therefore harder for an attacker to rebuild the dispatching logic and thus the first control flow. In addition to that, it is also difficult to brute force the dispatching logic in an isolated manner.

For example, based on the value(s) of the used predefined variable(s), possibly if a condition(s) is satisfied by the concerned predefined variable(s), like e.g., "if (x<7))", then the first or the second processor is executing, under control of the second processor that is executing the second application, the seventh node 214, as the first node of the first branch 2140, in the right first control flow.

The second node 32, as dispatching node, has two or more children, like e.g. 4 children, namely the third node 34, the fourth node 36, the fifth node 38 and the sixth node 310.

Each child, namely the third node 34, the fourth node 36, the fifth node 38 and the sixth node 310, has the second node 32, as its own child.

The second processor is executing, in synchronization with the first control flow execution, a second application associated with the third node 34.

The second processor knows that the right first control flow includes a corresponding third node (not represented).

The second application comprises one or several predefined variables, such as a predetermined input parameter, like e.g., "x", that are set 342 to predefined values, like e.g., "x+=2", so as to authorize, when the second processor is executing the second application, a parallel execution of the third node 34 of the first control flow by the first processor.

The second processor is executing, in synchronization with the first control flow execution, a second application associated with the fifth node 38.

The second processor knows that the right first control flow includes a corresponding fifth node (not represented).

The second application comprises one or several predefined variables, such as a predetermined input parameter, like e.g., "x", that are set 382 to predefined values, like e.g., "x++", so as to authorize, when the second processor is executing the second application, a parallel execution of the fifth node 38 of the first control flow by the first processor.

The invention solution allows keeping or maintaining the used predefined variables in the second processor in a synchronized manner with an original control flow of an application to be executed by a first processor and, in an isolated manner.

The invention solution allows hiding the used predefined variables.

At a point of a decision, such as a transition decision, it is difficult for an attacker to understand why a certain branch (or path) is used.

The invention solution allows preventing an attacker from isolating a portion(s) of a thus protected application.

The invention solution allows protecting an application from being reverse engineered.

The embodiment that has just been described is not intended to limit the scope of the concerned invention. Other embodiments may be given. As another embodiment example, instead of a second application(s) that is(are) executed, by a second processor, included in a HW token chip, the second application(s) is(are) executed by another SW or HW entity (not represented), such as a (local or remote) server or a separate service, that is preferably secure.

The invention claimed is:

1. A method for managing an execution of a program relating to at least a part of a first application, as a first application program, comprising:
    a) executing, by a first processor, a first control flow;
    b) executing, by a second processor, in synchronization with the first control flow execution, at least one second application, the at least one second application comprising, each, when executed by the second processor in synchronization with the first control flow execution, at least one predetermined variable and at least one expected value that the at least one predetermined variable has to have or at least one predetermined condition that the at least one predetermined variable has to satisfy to authorize an execution of the correct first control flow by the first processor, said second processor thus keeping or maintaining, in a manner isolated from first processor, at least one predetermined variable and at least one expected value that the at least one predetermined variable has to have or at least one predetermined condition that the at least one predetermined variable in a synchronized manner with the first control flow executed by the first processor;
    c) verifying, by the second processor, while executing each of the at least one second application in synchronization with the first control flow that is being executed by the first processor, whether the at least one predetermined variable has or has not the at least one expected value or whether the at least one predetermined variable does or does not satisfy the at least one predetermined condition; and
    d) inferring, by the second processor, if, for each of all of the at least one second application executed by the second processor, the at least one predetermined variable has the at least one expected value or the at least one predetermined variable satisfies the at least one predetermined condition, that the first processor is executing the correct first control flow; or
    e) inferring, by the second processor, if, for at least one of the at least one second application executed by the second processor, the at least one predetermined variable does not have the at least one expected value or the at least one predetermined variable does not satisfy the at least one predetermined condition, that the first processor is not executing the correct first control flow.

2. The method according to claim 1, wherein, the first control flow includes at least two separated branches, each of the at least two separated branches including at least one node, and the second processor determines, when executing the at least one second application, at least one transition decision between at least two first nodes of the at least two separated branches, the at least one transition decision being conditional to continue from an execution of the current node to an execution of a first node of one branch of the at least two separated branches or a first node of another branch of the at least two separated branches.

3. The method according to claim 2, wherein the at least one transition decision depends on at least one predetermined variable.

4. The method according to claim 3, wherein the at least one predetermined variable is internally used by the second processor, when executing the at least one second application.

5. The method according claim 3, wherein the at least one predetermined variable includes at least one element of a group comprising:
    at least one predetermined input parameter; and
    at least one predetermined internal state variable.

6. The method according to claim 5, wherein the at least one predetermined internal state variable includes at least one predetermined identifier relating to at least one node to be executed in the first control flow by the first processor.

7. The method according to claim 1, wherein the first control flow includes at least one dispatching node, each of the at least one dispatching node having at least two children, each of the at least two children having the dispatching node, as its own child.

8. The method according to claim 1, wherein, if, for at least one of the at least one second application executed by the second processor, the at least one predetermined variable does not have the at least one expected value or the at least one predetermined variable does not satisfy the at least one predetermined condition, the first or second processor executes at least one predetermined instruction, the at least one predetermined instruction allowing, when executed, to issue either no result or a result value that is distinct from a correct result value that is issued only when the correct first control flow is effectively executed by the first processor.

9. A system for managing an execution of a program relating to at least a part of a first application, as a first application program, the system comprising a first device and a second device, the first device comprising a first processor, the second device comprising a second processor;
   wherein the first processor is configured to execute a first control flow;
   wherein the second processor is configured to:
   execute, in synchronization with the first control flow execution, at least one second application, the at least one second application comprising, each, when executed in synchronization with the first control flow execution, at least one predetermined variable and at least one expected value that the at least one predetermined variable has to have or at least one predetermined condition that the at least one predetermined variable has to satisfy to authorize an execution of the correct first control flow by the first processor, said second processor thus keeping or maintaining, in a manner isolated from first processor, at least one predetermined variable and at least one expected value that the at least one predetermined variable has to have or at least one predetermined condition that the at least one predetermined variable in a synchronized manner with the first control flow executed by the first processor;
   verify, while executing each of the at least one second application in synchronization with the first control flow that is being executed by the first processor, whether the at least one predetermined variable has or does not have the at least one expected value or whether the at least one predetermined variable does or does not satisfy the at least one predetermined condition; and
   infer, if, for all of the at least one second application executed by the second processor, the at least one predetermined variable has the at least one expected value or the at least one predetermined variable satisfies the at least one predetermined condition, that the first processor is executing the correct first control flow; or
   infer, if, for at least one of the at least one second application executed by the second processor, the at least one predetermined variable does not have the at least one expected value or the at least one predetermined variable does not satisfy the at least one predetermined condition, that the first processor is not executing the correct first control flow.

10. A device for managing an execution of a program relating to at least a part of a first application, as a first application program, the device comprising a first processor and a second processor;
   wherein the first processor is configured to execute a first control flow;
   wherein the second processor is configured to:
   execute, in synchronization with the first control flow execution, at least one second application, the at least one second application comprising, each, when executed in synchronization with the first control flow execution, at least one predetermined variable and at least one expected value that the at least one predetermined variable has to have or at least one predetermined condition that the at least one predetermined variable has to satisfy to authorize an execution of the correct first control flow by the first processor, said second processor thus keeping or maintaining, in a manner isolated from first processor, at least one predetermined variable and at least one expected value that the at least one predetermined variable has to have or at least one predetermined condition that the at least one predetermined variable in a synchronized manner with the first control flow executed by the first processor;
   verify, while executing each of the at least one second application in synchronization with the first control flow that is being executed by the first processor, whether the at least one predetermined variable has or does not have the at least one expected value or whether the at least one predetermined variable does or does not satisfy the at least one predetermined condition; and
   infer, if, for all of the at least one second application executed by the second processor, the at least one predetermined variable has the at least one expected value or the at least one predetermined variable satisfies the at least one predetermined condition, that the first processor is executing the correct first control flow; or
   infer, if, for at least one of the at least one second application executed by the second processor, the at least one predetermined variable does not have the at least one expected value or the at least one predetermined variable does not satisfy the at least one predetermined condition, that the first processor is not executing the correct first control flow.

* * * * *